3,266,983
4-HALO-1-METHOXYNAPHTHALENES AS SOIL FUNGICIDES

Richard K. Brantley, Wilmington, Del., assignor to E. I. du Pont de Nemours and Company, Wilmington, Del., a corporation of Delaware
No Drawing. Filed Aug. 28, 1964, Ser. No. 392,934
4 Claims. (Cl. 167—32)

This invention relates to the use of chemicals as soil fungicides.

More specifically, it refers to a method of protecting plants from soil fungi by applying to soil infected with soil fungi a plant protectant amount of a 4-halo-1-methoxynaphthalene.

Soil fungi present unique problems to the average farmer or horticulturist. Frequently, these insidious organisms are the direct cause of poor crop yields. Since soil fungi attack growing plants clandestinely farmers are not always aware of their presence and tend to erroneously blame poor crop yields on insufficient application of fertilizer, bad weather, etc. I have found a way to protect plants from these fungi and thereby encourage the production of good crop yields.

The plant protectant compounds used in my invention are any of the following:

4-fluoro-1-methoxynaphthalene,
4-chloro-1-methoxynaphthalene, and
4-bromo-1-methoxynaphthalene.

4-fluoro-1-methoxynaphthalene is prepared in the following manner. 4-methoxy-1-naphthylamine dissolved in an aqueous sulfuric acid solution is diazotized with sodium nitrite. A concentrated solution of ammonium fluoroborate is added to the solution of the diazonium salt in order to precipitate 4-methoxy-1-naphthyldiazonium fluoroborate. This compound is collected, dried and decomposed with heat. The desired 4-fluoro-1-methoxynaphthalene is isolated by steam distillation of the decomposition products.

The chloro and bromo compounds are made in the manner taught respectively in C.A., 47, 3244 (1953), and Beilstein, 6, II, 582.

Soil fungi controlled by the three compounds used in my invention include Rhizoctonia spp., Fusarium spp., Sclerotinia spp., Pellocularia spp., Pythium spp., Gleocercospora spp., Phytophthora spp. and Thielaviopsis spp.

In order to protect plants the compounds used in this invention are applied to soil in compositions comprising the active ingredient and one or more surfactants commonly used in conventional fungicide formulations.

The surfactant or surface-active agent can include any of the anionic, cationic and non-ionic surface-active agents. Suitable ones are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1964) by John W. McCutcheon, Inc.

The amount of surfactant present in compositions of this invention range from 0.1 to 20% by weight. However, it is preferred to use 0.2 to 10% by weight of surfactant.

Low strength compositions containing the active ingredient at the rate of 1 to 5% by weight can contain with or without surfactant present a common liquid solvent of the type conventionally used in pesticidal compositions. Other formulations such as emulsifiable solutions, free-flowing inert powders, wettable powder compositions, granules and pellets can be used as desired for a particular type of application. The exact composition will be determined by the type of soil, weather conditions, packaging limitations and the particular desires of the users.

In addition to the standard formulating ingredients, compositions of this invention can contain other known fungicides. Illustrative of some of these fungicides are:

p-Dimethylaminobenzenediazo sodium sulfonate;
Quinone oxyaminobenzooxohydrazone;
Tetraalkyl thiuram sulfides such as tetramethyl thiuram monosulfide or disulfide and tetraethyl thiuram monosulfide or disulfide;
Metal salts of ethylene bisdithiocarbamic acid, e.g. manganese, zinc, iron and sodium salts;
Pentachloronitrobenzene;
Dodecylguanidine acetate;
N-trichloromethylthiotetrahydrophthalimide (captan);
Phenylmercury acetate;
2,4-dichloro-6-(o-chloroaniline)-s-triazine
N-methylmercury p-toluenesulfonanilide;
Chlorophenolmercury hydroxides;
Nitrophenolmercury hydroxides;
Ethylmercury acetate;
Ethylmercury 2,3-dihydroxypropyl mercaptide;
Methylmercury acetate;
Methylmercury 2,3-dihydroxypropyl mercaptide;
3,3'-ethylenebis(tetrahydro-4,6-dimethyl-2H-1,3,5-thiadiazine-2-thione);
Methylmercury dicyandiamide;
N-ethylmercury-p-toluenesulfonilide metal (e.g. iron, sodium and zinc), ammonium and amine salts of dialkyl dithiocarbamic acids;
Tetrachloronitroanisole;
Hexachlorobenzene;
Hexachlorophene;
Methylmercury nitrile;
Tetrachloroquinone; and
N-trichloromethylthiophthalimide.

The above fungicides are added to compositions containing the active ingredient used in this invention at the rate of 1 to 400 pounds to each 20 pounds of a compound within the scope of this invention. Illustrative of fungicides used at low rates with the active ingredients of this case are the above-described organo mercurials. Illustrative of fungicides used at high rates with the active ingredients of this case are thiuram sulfides and captan. Of course, more or less of the above-listed fungicides can be added to a 4-halo-1-methoxynaphthalene composition depending on the fungi present in the area to be protected.

Compositions of this invention can additionally contain soil insecticides such as chlordane, DDT, dieldrin, endrin, aldrin, methoxychlor and others for control of insects in the soil. From 0.1 to 10 parts by weight of the insecticide is used for each one part by weight of 4-halo-1-methoxynaphthalene.

Wettable powder formulations containing a 4-halo-1-methoxynaphthalene with or without an insecticide or additional fungicide are blended with a diluent and a surfactant and then ground in a hammer mill to obtain intimately blended finely divided particles. This type of formulation can be dispersed in water and sprayed in broadcast treatments followed by rotovation into the soil or sprayed in-the-furrow.

Dust compositions containing a 4-halo-1-methoxynaphthalene with or without an insecticide or additional fungicide can be prepared by blending with a diluent and grinding in a hammer mill. These dust compositions can be applied to the soil in conventional dusting equipment in broadcast treatments, in-the-row treatments or as a hopperbox treatment as part of a seeding operation.

Emulsifiable compositions can be made by dissolving a 4-halo-1-methoxynaphthalene with or without an insecticide or other fungicides in an inert solvent containing an emulsifier. These compositions are emulsified in water and applied to the soil much like the wettable powders above.

Granules are conveniently prepared by spraying a solution of a 4-halo-1-methoxynaphthalene together with any desired surfactant, insecticide or additional fungicide, in a solvent upon preformed granules consisting of, for example, clay or vermiculite.

The plant protectant compositions of this invention can also contain nematocides such as "Nemagon"® 1,2-dibromo-3-chloropropane and "D-D"® mixture of dichloropropane and dichloropropene in order to protect plants from a broad spectrum of nematodes. The above nematocides are present in the range of 0.1 to 10 parts by weight for each one part by weight of 4-halo-1-methoxynaphthalene. These combinations can be formulated in a manner similar to the compositions described above.

In addition compositions can contain special additives such as corrosion inhibitors, pigments, anti-foam agents and the like.

APPLICATION

Compounds used in this invention can be sprayed directly or in formulations on or in the soil. Soil applications are applied at or before planting, as a side dressing to living plants, in-the-furrows, as a hopper-box treatment and as a soil drench. The plant protectant dosage is from one-half to 100 pounds of active ingredient per acre treated depending on method of application and soil type.

Good results are obtained by an in-the-row treatment. Spray is directed on a band approximately two to four inches wide in such a way as to strike the sides of the furrow as well as the bottom of the furrow. Seed can then be planted and the furrow closed. The seeds, seedlings and growing plants are protected from attack by soil fungi. Alternatively, compounds of this invention can be rotovated into this band. One-half to 5 pounds of active ingredient per 12,000 feet of a two-inch wide row give satisfactory plant protection against fungi.

In-the-row treatment is extremely useful in protecting seeds, newly-germniated seedlings and growing plants of corn, tomatoes, watermelon, squash, carrots, lettuce, cantaloupe, peppers, cucumbers, beans, cotton, tobacco, ornamentals and the like from attack by soil fungi.

Granular formulations can be used either broadcast or in the row and applied using conventional equipment.

Soil drench treatments protect seeds, seedlings, and plants from the ravages of soil fungi by application of the compounds used in this invention at rates of 5 to 100 pounds of active ingredient per acre.

Compounds used in this invention can also be mixed with cotton seeds in the hopper-box treatment at planting time at rates of one to 32 ounces of active ingredient per cwt. of seeds to give protection from soil fungi. A preferred rate because of excellent protection and low cost is two to sixteen ounces of active ingredient per cwt. of seeds. Cotton seeds treated with compounds within the scope of this invention in the above-described manner are effectively protected against soil fungi as are the seedlings and growing plants.

In order that this invention can be better understood, the following additional examples are provided. It should be understood that all percentages given are by weight unless otherwise specified.

Example 1

The following formulation is prepared by spraying the 4-fluoro-1-methoxynaphthalene, which has been fluidized by pre-heating, onto a warm mixture of attapulgite clay and synthetic silica while agitating the mixture in an efficient blender. While cooling, the methyl cellulose, sodium alkylnaphthalene sulfonate and anhydrous disodium phosphate are added. This mixture is then micropulverized to obtain a wettable powder in which substantially all the particles have a particle size less than 50 microns.

| | Percent |
|---|---|
| 4-fluoro-1-methoxynaphthalene | 25.0 |
| Attapulgite clay | 68.0 |
| Synthetic fine silica | 4.0 |
| Methyl cellulose, low viscosity | 0.5 |
| Alkyl naphthalene sulfonic acid, sodium salt | 1.5 |
| Anhydrous disodium phosphate | 1.0 |

This wettable powder is mixed with water and rotovated into soil infested with the black shank fungus *Phytophthora parasitica* var. *nicotinae*. The rate used is fifty pounds per acre of active ingredient. Tobacco seedlings planted in the treated soil are protected from attack by this fungus, resulting in a healthy crop of tobacco. Tobacco plants planted in untreated soil grow poorly resulting in less yield than from tobacco grown in treated soil.

Example 2

| | Percent |
|---|---|
| 4-chloro-1-methoxynaphthalene | 20.0 |
| Diatomaceous earth | 50.0 |
| Kaolinite | 27.5 |
| Sodium dioctyl sulfosuccinate | 0.5 |
| Sodium lignin sulfonate | 2.0 |

The 4-chloro-1-methoxynaphthalene is fluidized by heating. It is sprayed upon the diatomaceous earth and kaolinite while being blended. The surfactants are added next and the mixture is blended thoroughly. This latter blended mixture is ground in a hammer mill to obtain a homogeneous mixture in which substantially all of the particles are 50 microns or less.

This wettable powder is mixed with water and rotovated into soil infested with the black root rot fungus *Thielaviopsis basicola*. The rate used is fifty pounds per acre of active ingredient. Tobacco seedlings planted in the treated soil are protected from attack by the fungus, resulting in a healthy crop of tobacco. Tobacco plants planted in untreated soil grow poorly resulting in less yield than from tobacco grown in treated soil.

Example 3

| | Percent |
|---|---|
| 4-bromo-1-methoxynaphthalene | 40 |
| Alkylated naphthalene | 55 |
| Mixed polyoxyethylene ethers and oil soluble sulfonates | 5 |

The active ingredients and the emulsifier are added to the alkylated naphthalene in an agitated vessel which is provided with a steam jacket to make gentle heating possible. Heat and agitation are supplied until a homogeneous mixture is obtained which can be emulsified readily in water for spray application.

This formulation is emulsified in water and sprayed in an open furrow at three pounds per acre of active ingredient. Bean seeds are planted in the treated furrow at the same time as the treatment is made and the furrow closed. The bean seeds germinate and the seedlings and growing plants are protected from attack by the fungus *Rhizoctonia solani* resulting in a healthy stand and good crop of beans. Bean seeds planted in untreated soil are essentially destroyed and the few plants that remain are severely diseased and produce a poor crop.

Example 4

The following product is prepared by blending the ingredients as listed below and then passing the mixture through a deagglomerator such as an Entoleter mill to obtain a finely divided dust in which the soil fungicides and soil insecticides are uniformly distributed throughout.

| | Percent |
|---|---|
| Wettable powder of Example 2 | 40 |
| Dieldrin, 50% W.P. | 6 |
| Micaceous talc | 54 |

This mixture which contains 8% 4-chloro-1-methoxybenzene and 3% active dieldrin is useful as a hopper box treatment for seeds such as cotton. Ten pounds of this dust is mixed with a hundred weight of machine-delinted cotton seed for hopper box application at planting time. After planting these protected seeds germinate and the cotton seedlings and growing plants are protected from soil fungi such as Rhizoctonia spp. and Pythium spp. and from insects such as wireworms resulting in a healthy stand of cotton which produces an excellent yield of cotton per acre. Seeds not treated as above frequently do not germinate and those that do result in seedlings which are later attacked by the above fungi resulting in a poor crop of cotton.

*Example 5*

Soil fungicide granules are prepared by mixing the following ingredients:

| | Parts |
|---|---|
| 4-chloro-1-methoxynaphthalene | 2 |
| Alkylated naphthalene | 4 |
| Polyoxyethylated alkyl phenol | 1 |

These ingredients form a homogeneous solution which is then sprayed over the surface of 93 parts of preformed and pre-screened clay granules, substantially all of the granules being in the fifteen to thirty mesh range. The granular product is then suitable for application in the standard granule applicators to soil prior to planting.

This formulation is rotovated into soil infested with soil fungi such as *Rhizoctonia solani* and Pythium spp. The rate used depending on soil type is from fifteen to sixty pounds per acre of active ingredient. Cucumber seeds are planted and subsequently grow and produce an acceptable crop. Cucumber seed planted in untreated soil frequently do not germinate and those that do are generally diseased resulting in reduced yields.

*Example 6*

| | Percent |
|---|---|
| 4-bromo-1-methoxynaphthalene | 30 |
| "Nemagon"® 1,2-dibromo-3-chloropropane | 10 |
| Alkylated naphthalene | 55 |
| Mixed polyoxyethylene ethers and oil soluble sulfonates | 5 |

The active ingredient and the emulsifier are added to the alkylated naphthalene and "Nemagon"® in an agitator vessel. The contents of the vessel are agitated until a homogeneous mixture is obtened which can be emulsified readily in water for spray application. An application of 200 pounds per acre of this formulation can be rotovated with soil infested with Rhizoctonia spp., Pythium spp., *Fusarium oxysporum* f. *vasinfectum*, *Verticillium albo-atrum* and Meloidogyne spp., (root knot nematodes). Cotton planted in the treated soil is protected from the above pathogens resulting in healthy plants and an excellent yield of cotton. Cotton planted in untreated soil frequently damp-off and wilt.

The invention claimed is:

1. Method for protecting plants from attack by soil fungi comprising applying to soil infected with soil fungi a plant protectant amount of a compound selected from the group consisting of
   4-fluoro-1-methoxynaphthalene,
   4-chloro-1-methoxynaphthalene, and
   4-bromo-1-methoxynaphthalene.

2. A method according to claim 1 wherein the compound applied is 4-fluoro-1-methoxynaphthalene.

3. A method according to claim 1 wherein the compound applied is 4-chloro-1-methoxynaphthalene.

4. A method according to claim 1 wherein the compound applied is 4-bromo-1-methoxynaphthalene.

No references cited.

LEWIS GOTTS, *Primary Examiner.*

S. K. ROSE, *Assistant Examiner.*